United States Patent [19]
Ota et al.

[11] Patent Number: 5,867,314
[45] Date of Patent: Feb. 2, 1999

[54] STRUCTURE OF OPTICAL PASSIVE DEVICE AND ASSEMBLING METHOD THEREFOR

[75] Inventors: Yuko Ota, Maisaka-cho; Koyu Takahashi, Kosai; Shigetaka Goto, Hamamatsu; Mototsugu Goto, Kosai; Terushi Otani, Tahara-cho, all of Japan

[73] Assignee: Fuji Electrochemical Co., Ltd., Tokyo, Japan

[21] Appl. No.: 699,213

[22] Filed: Aug. 19, 1996

Related U.S. Application Data

[63] Continuation of Ser. No. 352,909, Dec. 9, 1994, abandoned.

[30] Foreign Application Priority Data

Dec. 9, 1993 [JP] Japan ................................. 5-340400
Nov. 29, 1994 [JP] Japan ................................. 6-294294
Dec. 1, 1994 [JP] Japan ................................. 6-298714

[51] Int. Cl.$^6$ ............................... G02B 5/30; H01F 3/00
[52] U.S. Cl. ..................... 359/484; 359/280; 372/703; 335/298
[58] Field of Search ................... 359/281, 282, 359/283, 484, 280, 284; 372/703, 27, 37; 313/433; 335/217, 297, 298

[56] References Cited

U.S. PATENT DOCUMENTS

| | | | |
|---|---|---|---|
| 3,781,592 | 12/1973 | Harrold | 335/210 |
| 4,962,990 | 10/1990 | Matsuzawa et al. | 324/244.1 |
| 4,999,571 | 3/1991 | Ishiko et al. | 324/96 |
| 5,020,073 | 5/1991 | Alfrey et al. | 372/27 |
| 5,029,953 | 7/1991 | Dexter et al. | 372/703 |
| 5,087,984 | 2/1992 | Heney et al. | 359/282 |
| 5,103,200 | 4/1992 | Leupold | 335/217 |
| 5,161,049 | 11/1992 | Tanno et al. | 359/281 |
| 5,216,401 | 6/1993 | Leupold | 335/306 |
| 5,305,137 | 4/1994 | Ohkawara | 372/703 |
| 5,341,235 | 8/1994 | Watanabe et al. | 372/703 |
| 5,382,936 | 1/1995 | Leupold t al. | 335/210 |
| 5,452,122 | 9/1995 | Tsuneda et al. | 359/484 |
| 5,519,467 | 5/1996 | Suzuki et al. | 359/484 |
| 5,528,415 | 6/1996 | Gauthier et al. | 359/484 |

FOREIGN PATENT DOCUMENTS

| | | | |
|---|---|---|---|
| 62-118315 | 5/1987 | Japan . | |
| 63-142320 | 6/1988 | Japan | 359/484 |
| 1-302319 | 12/1989 | Japan | 372/703 |
| A0214813 | 8/1990 | Japan | 359/280 |
| A0228624 | 9/1990 | Japan | 359/280 |
| 3-68915 | 3/1991 | Japan . | |
| 3-107915 | 5/1991 | Japan | 372/703 |
| A0107815 | 5/1991 | Japan | 359/280 |
| A0148621 | 6/1991 | Japan | 359/280 |
| 4-93814 | 3/1992 | Japan | 372/703 |
| 4-234012 | 8/1992 | Japan | 372/703 |
| 6-43394 | 2/1994 | Japan . | |
| 6-265819 | 9/1994 | Japan | 372/703 |

*Primary Examiner*—Cassandra C. Spyrou
*Assistant Examiner*—John Juba, Jr.
*Attorney, Agent, or Firm*—Wenderoth, Lind & Ponack, L.L.P.

[57] ABSTRACT

A hollow magnetic member includes a plurality of separate magnetic pieces. A parting surface between such pieces is defined by a plane parallel to or defining an angle of not more than forty-five (45) degrees with a center axis of the magnetic member. A holder for supporting a polarizer has such a cross section defined by a part of a cylinder cut away along a plane parallel to or defining an angle of not more than forty-five (45) degrees with the center axis thereof. A notched portion is formed in a cutting surface for containing the polarizer. A jig for assembly includes a base for holding the holder and a plate for positioning optical elements such as the polarizer. The holder is disposed in a recess in the base with the notched portion directed upward. A bonding material is applied to the notched portion prior to installation of the polarizer. The plate is placed on the base by inserting pins through holes, and then a screw is engaged with a tapped hole. The polarizer is inserted through an opening in the plate and is received in the notched portion positioned just below the opening.

57 Claims, 17 Drawing Sheets

STRUCTURE OF OPTICAL PASSIVE DEVICE AND ASSEMBLING METHOD THEREFOR

This application is a continuation of now abandoned application, Ser. No. 08/352,909, filed Dec. 9, 1994.

BACKGROUND OF THE INVENTION

1. Field of the Invention

The present invention generally relates to structures and assembling methods for an optical passive device including optical components such as a magneto-optical crystal which has a Faraday effect (hereinafter referred to as a "Faraday component") and a polarizer.

2. Background Art

An optical passive device is a type of optical component interposed in an optical network so that an optical signal transmitted therethrough can be distributed and controlled with respect of its transmission direction. Recently, such devices have been widely put into use as a result of the prevalence of optical transmission lines.

An example of such an optical passive device is an optical isolator that is a device for selectively controlling the passage of a light ray according to the transmission direction of light, by utilizing the Faraday effect, i.e., a rotating effect of a plane of polarization by a Faraday rotator. FIGS. 17(a) and 17(b) illustrate conventional basic structures of optical isolators. In the structure shown in FIG. 17(a), a Faraday component 2 is placed in a hollow portion of a hollow cylindrical magnetic member 1, and polarizers 3 are attached at opposite ends of the magnetic member 1. Though either polarizer is usually called an analyzer, a polarizer and an analyzer are basically the same optical elements. Thus, the term "polarizer" is employed throughout this specification for avoiding awkwardness of distinguishing an analyzer from a polarizer. The Faraday component 2 is supported in the magnetic member 1 and rotates the plane of polarization of an incident light ray by forty-five (45) degrees by the effect of the magnetic field of the magnetic member 1. The combination of the magnetic member 1 and the Faraday component 2 constitutes a Faraday rotator.

As for the structure in FIG. 17(b), a circular yoke 4 is disposed around the Faraday component 2. The yoke 4 is integrally assembled with two cylindrical magnetic members 1a, 1b fastening the yoke 4 therebetween. The polarizers 3 are attached on the ends of the cylindrical magnetic members 1a and 1b, respectively.

FIG. 18 illustrates an optical isolator with holders which support the polarizers 3. The optical isolator 6 includes a hollow cylindrical magnetic member 1, a Faraday component 2, polarizers 3 and polarizer holders (hereinafter referred to as a "holder") 5. Holders 5 are disposed at opposite axial ends of the magnetic member 1. Each holder 5 contains a respective polarizer 3. The polarizers 3 are so disposed that an angular difference of the planes of polarization thereof is forty-five (45) degrees around the optical axis.

FIGS. 19(a) and 19(b) are sectional views of typical conventional holders. The holder 5 in FIG. 19(a) is a circular cap with a recessed cross section and a slanted inner bottom surface inclined to the center axis thereof. Accordingly, the polarizer 3 fixed at the bottom of the holder 5 also has a certain amount of slant or incline to the axis. The holder 5 in FIG. 19(b) has a hollow cylindrical shape unlike the holder for the isolator shown in FIG. 18. The holder 5 in FIG. 19(b) holds the polarizer 3 in the hollow portion thereof. The polarizer 3 is connected to the inner surface of the holder 5 so that the polarizer 3 may have a certain amount of slant or incline to the center axis thereof.

FIG. 20 illustratively shows the installation of the polarizer 3 into the holder 5 in FIG. 19(b). In this example, a jig 7 with a cylindrical projection 7a mating with the hollow portion of the holder 5, is used for installation of the polarizer 3 into the holder 5. The holder 5 is placed around the projection 7a and the polarizer 3 is put on the top surface of the projection 7a. Then, the polarizer 3 and the holder 5 are fastened together. For fastening, various methods and materials may be employed, such as fastening with organic adhesive, solder or bonding glass. As described above, it may be common to place optical elements, for example, the polarizer 3, with a certain amount of slant or incline to the optical axis so as to avoid disturbance to the incident light by direct reflection from the element. In this case, the projection 7a may be so formed that the top surface thereof has a certain amount of slant or incline to the center axis of the holder 5.

Considering these structures of conventional optical isolators, the isolator in FIG. 17(a) may have a shortcoming in that it is awkward to dispose and fix the Faraday component 2 in the hollow portion of the cylindrical magnetic member 1, and thus is not suitable for mass production. Particularly, when the design policy of the isolator is strongly oriented to miniaturization, it may become difficult not only to assemble the elements but also to form a cylindrical magnetic member 1. For example, in the case of forming a miniature cylindrical magnetic member, the outer diameter of which is not more than five (5) millimeters, relatively expensive ways of manufacturing such as wire cutting must be employed instead of ordinary press working. Thus, mass production may not be easily achieved.

As for the structure shown in FIG. 17(b), because the Faraday component 2 is placed between the cylindrical magnetic members 1a and 1b, magnetic flux generated by the magnetic members 1a, 1b may not be efficiently used. As a result, stronger and larger magnetic members than those in other structures must be employed. As a result, optical isolators of this type cannot easily be miniaturized.

On the other hand, the holder 5 described in FIG. 19(a) may have following problems. Because the optical surface, i.e. the surface through which a light ray passes, of the polarizer 3 also constitutes a surface to be mounted to the holder 5, the optical surface is sometimes damaged by contact with the holder 5. The optical surface of the polarizer 3 also may be contaminated by bonding material such as adhesive agent fastening the polarizer 3 to the holder 5. Furthermore, because the length of the holder 5 is increased due to thickness of the inner bottom of the holder 5, the optical isolator including this type of holder may not be sufficiently miniaturized. In addition, it may be less effective to manufacture the cap-shaped holder 5 having a slanted or inclined inner bottom surface because of manufacturing costs.

In FIG. 19(b), the holder 5 does not have a positioning portion for the polarizer 3. Therefore, it may be difficult to support the polarizer 3 at a predetermined position so as to maintain a certain angle of incline to the optical axis. Thus, assembling efficiency may not be sufficient.

OBJECTS OF THE INVENTION

One object of the invention is to provide an optical passive device which will enable miniaturization thereof and improvement of assembling efficiency thereof.

Another object of the invention is to provide a manufacturing method of an optical passive device and a jig used therefor, which will improve assembling efficiency and assembling accuracy of the optical passive device employing the structures described herein.

SUMMARY OF THE INVENTION

According to one aspect of the present invention, an optical passive device includes a Faraday component, a magnetic member supporting the Faraday component and applying a magnetic field thereto and polarizers disposed on an optical axis of a Faraday rotator including the Faraday component and the magnetic member, according to the rotation angle of the plane of polarization of the Faraday rotator. The magnetic member is a hollow cylindrical magnetic member formed by a plurality of separate magnetic pieces. Preferably, the magnetic member is separated into the separate pieces along confronting surfaces that extent parallel to or define an angle of not more than forty-five (45) degrees to a center axis of the member thereof, or by parting surfaces including the center axis. It is also preferable to provide the parting surfaces with positioning means for fixing pieces relative to each other in the radial and/or axial directions. Moreover, it is preferable to provide a shoulder for positioning the Faraday component in the hollow portion of the magnetic member.

According to another aspect of the invention, an optical passive device comprises a Faraday component, a magnetic member supporting the Faraday component and applying a magnetic field thereto, polarizers disposed on the optical axis of a Faraday rotator including the Faraday component and the magnetic member, according to the rotation angle of the plane of polarization of the Faraday rotator, and a supporting member for supporting and disposing the polarizers on the optical axis of the Faraday rotator. The supporting member is formed to have cross section in which a part of the supporting member is trimmed away along a plane parallel to or defining an angle of not more than forty-five (45) degrees with the center axis thereof. A notched portion for holding the polarizer therein is provided in the supporting member to extend inwardly thereof from a surface defined by the plane. Positioning means may be provided with the notched portion of the supporting member for positioning the polarizer.

According to a further aspect of the invention, an optical passive device features a magnetic member comprising a hollow cylindrical magnetic member including a plurality of separated magnetic pieces. A supporting member is formed to have cross section in which a part of the supporting member is trimmed away along a plane parallel to or defining an angle of not more than forty-five (45) degrees with the center axis thereof. A notched portion for holding the polarizer therein extends into the supporting member from a surface defined by the plane.

One aspect of the method of assembling an optical passive device of the present invention comprises the steps of disposing supporting members in recesses which fit the dimensions of the supporting members and provided in supporting member holding means, applying bonding material to the supporting members in the supporting member holding means, positioning optical element guiding means having a plurality of openings which are formed according to the shape of the optical elements and fastening the optical element guiding means to the supporting member holding means by fastening means, and inserting the optical elements into the openings formed in the optical element guiding means from the above and placing the optical elements in a predetermined position of the supporting members.

A jig used for the above method of the invention comprises supporting member holding means for holding optical element supporting members, and optical element guiding means for positioning the optical elements relative to the supporting members. The supporting member holding means includes recesses to receive the supporting members, a first engaging portion for positioning the optical element guiding means and a first fastening portion for holding the optical element guiding means. The optical element guiding means includes a plurality of openings into which the optical elements are inserted from above, a second engaging portion for engaging with the first engaging portion of the supporting member holding means and a second fastening means for engaging with the first fastening means.

According to the one aspect of the present invention, the polarizer is supported at the peripheral portion thereof, i.e., at surfaces other than optical surfaces, in the notched portion of the supporting member. A positioning means determining the position of the polarizer in the notched portion makes it easier to hold the polarizer during installation of the polarizer to the supporting member.

Optical elements may be correctly positioned relative to the supporting member disposed in the supporting member holding means due to the openings in the optical element guiding means. Thus, assembly is made easier while assembling accuracy is maintained.

According to the jig of the present invention, positioning of the optical element relative to the supporting member is achieved by fixing the optical element guiding means to the supporting member holding means.

Other features and advantages of the present invention will become apparent from the following detailed description of the best mode to carry out the invention and from the accompanying drawings.

DESCRIPTION OF PREFERRED EMBODIMENTS AND BEST MODE FOR CARRYING OUT THE INVENTION

Figure 1:
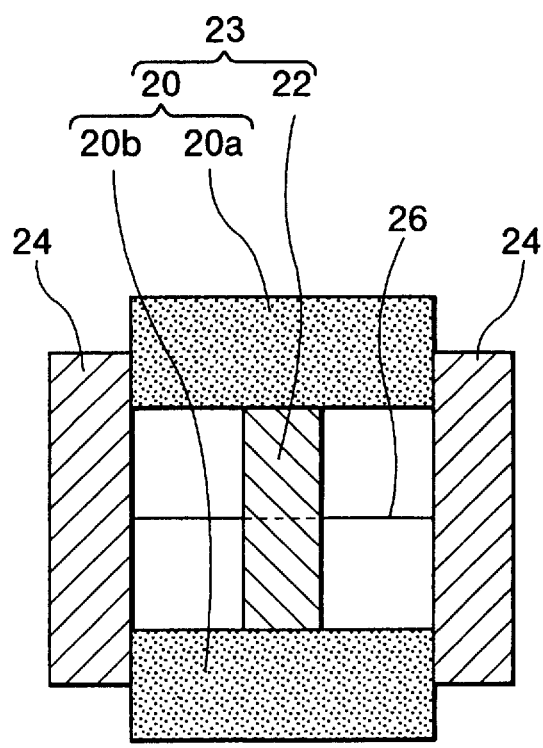
FIG. 1 is a cross-sectional view of an optical isolator according to one embodiment of the present invention.
Figure 17A:
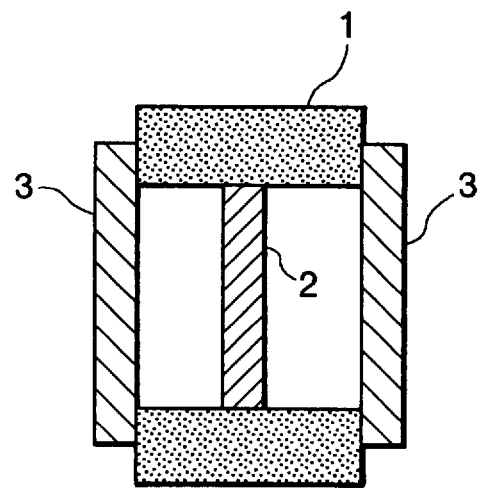
FIGS. 17(a), 17(b) and 18 are cross-sectional views of configurations of conventional optical isolators.
Figure 17B:
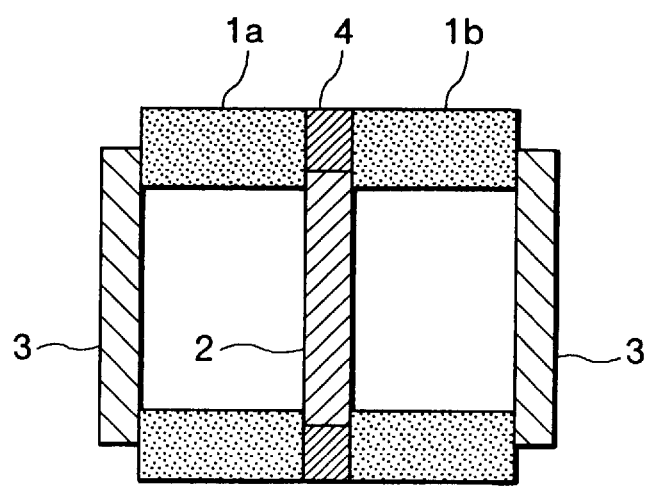
Figure 18:
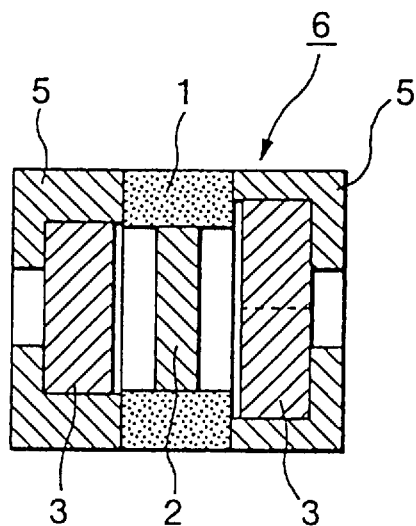
Figure 19A:
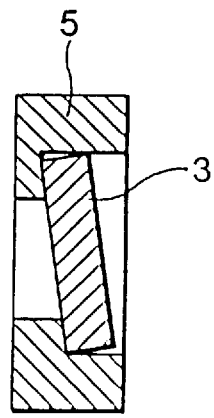
FIGS. 19(a) and 19(b) are sectional views of holders for conventional optical isolators.
Figure 19B:
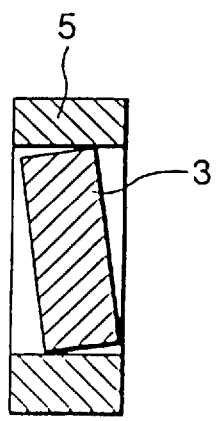
Figure 20:
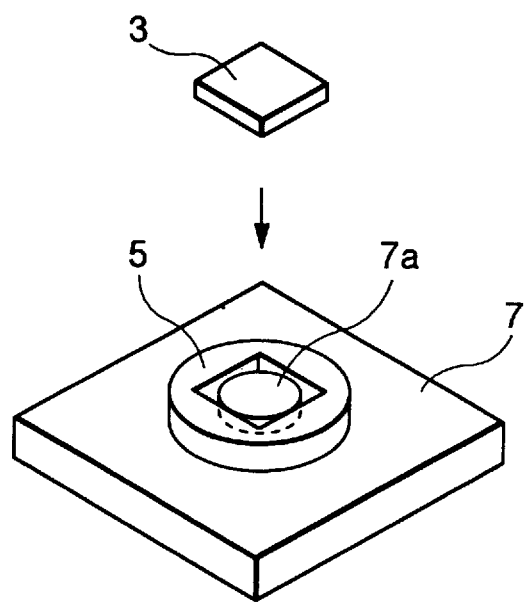
FIG. 20 is a perspective view illustrating an example of an assembling method of optical elements for conventional optical isolators.

FIG. 1 shows the configuration of an optical isolator according to one embodiment of the structure of the present invention. The isolator of this embodiment corresponds to the conventional one shown in FIG. 17(a). Referring to FIG. 1, the optical isolator includes a hollow cylindrical magnetic member 20, a Faraday component 22 fixed in the hollow portion thereof and polarizers 24 attached on the both sides of the magnetic member 20. The Faraday component 22 and the magnetic member 20 constitute a Faraday rotator 23. The magnetic member 20 further comprises a pair of half cylinder-shaped magnetic pieces 20a, 20b. The magnetic pieces 20a and 20b are fixed to each other at parting surfaces 26 of the cylindrical shape of member 20.

Figure 2A:
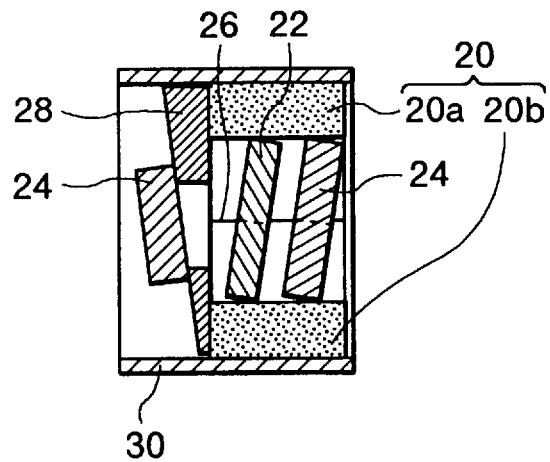
FIGS. 2(a), 2(b) and 2(c) respectively are sectional, end and perspective views of an optical isolator according to another embodiment of the present invention.
Figure 2B:
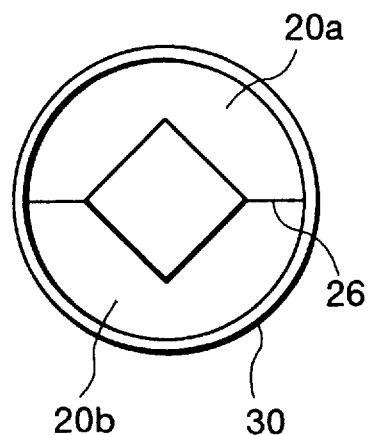
Figure 2C:
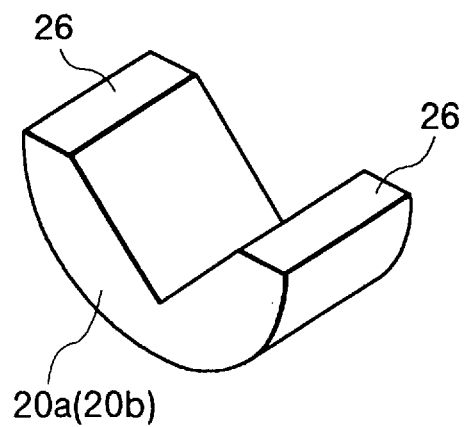

FIG. 2(b) shows two half magnetic pieces 20a, 20b of the same shape forming a hollow cylindrical magnetic member 20 shown in FIG. 1. The hollow portion of the magnetic member 20 has a square-shaped cross section. The two magnetic pieces 20a and 20b are adhered to each other integrally at the parting surfaces 26 which extend in a plane that includes the center axis of the hollow cylindrical member 20. For bonding of the pieces 20a and 20b, bonding material such as organic adhesive, solder or bonding glass is used. In this embodiment, the magnetic member 20 comprising magnetic pieces 20a and 20b has a cylindrical shape. Thus, the member 20 is contained in a tube 30, which may be dispensable in some cases. Unlike the isolator in FIG. 1, in this embodiment, the Faraday component 22 and the one polarizer 24 are installed in the hollow portion of the magnetic member 20 during the process in which the magnetic pieces 20a and 20b are fastened together into the cylindrical shape. Furthermore, the other polarizer 24 is attached on one end of the magnetic member 20 with a holder 28. The Faraday component 22 and the polarizers 24 are slanted or inclined to the optical axis of the device to avoid direct reflection towards a light source. As mentioned above, the magnetic pieces 20a and 20b have substantially the same shape and are made of, for example, sintered rare earth metal magnetic material or plastic-bonded magnetic formed by press working. Because the outer shape of the magnetic pieces 20a and 20b is simpler than that of conventional one-piece cylindrical magnet, which may not be manufactured by conventional press working due to its shape and size, each magnetic piece can be made by ordinary grinding operations without employing special processes such as wire cutting. Therefore, optical isolators according to the invention can be made smaller than conventional isolators.

Figure 3A:
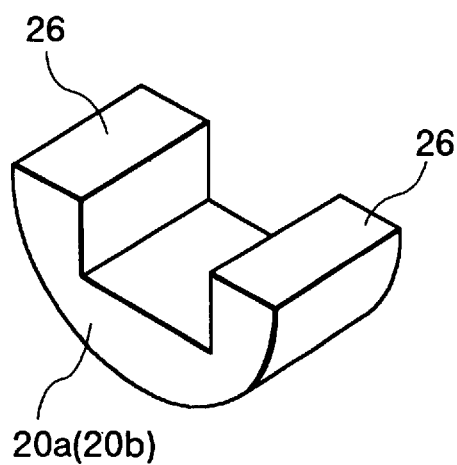
FIGS. 3(a) and 3(b) are perspective views of magnetic pieces of this invention.
Figure 3B:
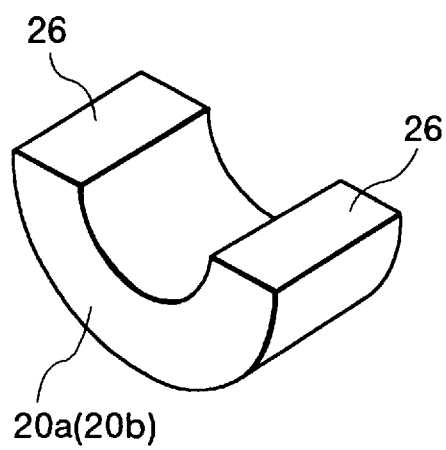
Figure 21:
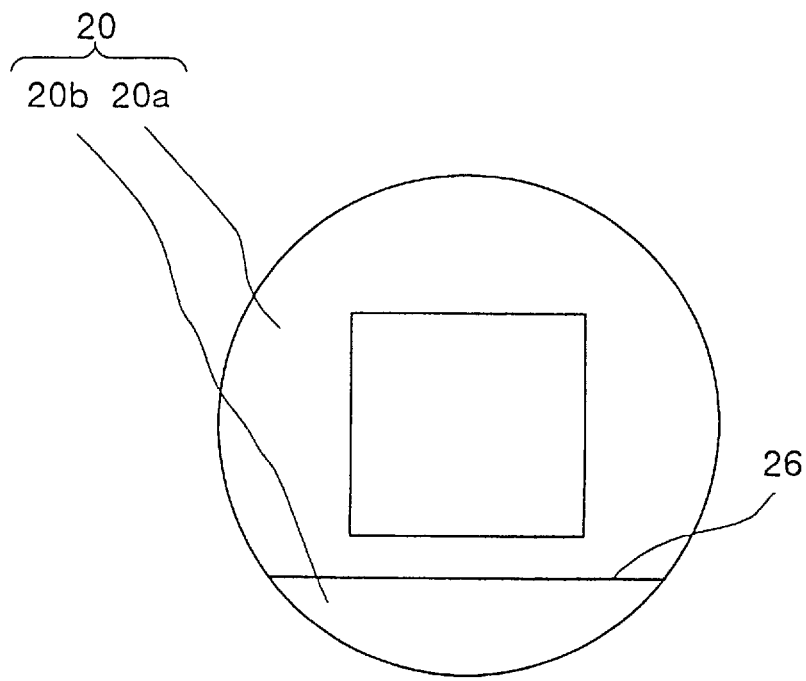
FIGS. 21(a) and 21(b) respectively are elevation and end views of magnetic pieces accordingly to another embodiment of the invention.
Figure 21:
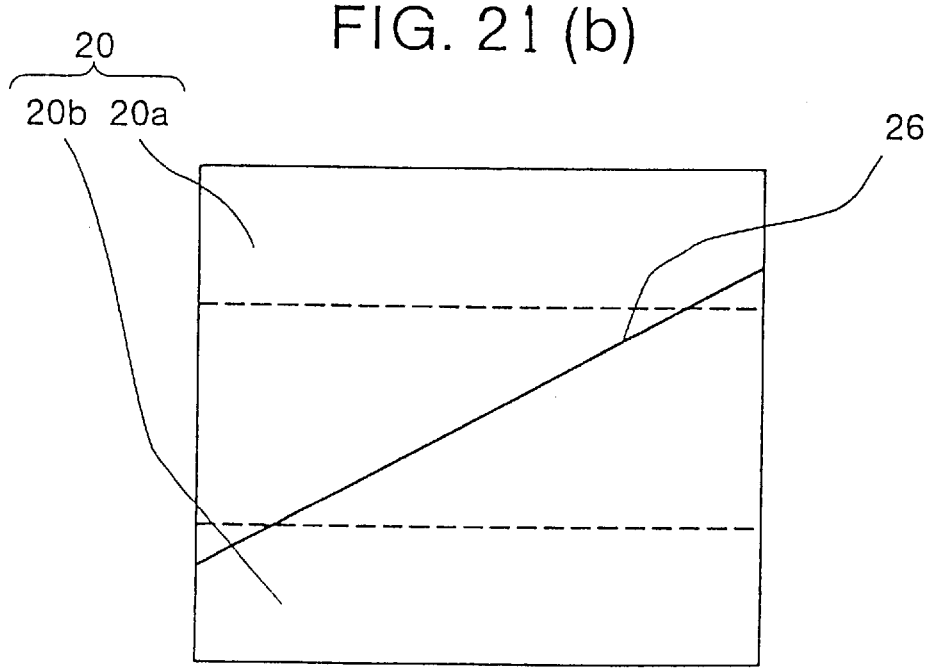

In the above embodiment, the cross section of the hollow portion of the cylindrical magnetic member 20 is substantially square and the parting surfaces 26 are defined by a plane including a diagonal of such square cross section. However, the parting surfaces 26 of the present invention are not intended to be limited to such arrangement. For example, as shown in FIG. 3(a), the parting surfaces 26 may be so situated in a plane that is equally spaced from either pair of facing sides of the square cross section of the hollow portion. The hollow portion of the magnetic member 20 may have a circular cross section as shown in FIG. 3(b). Additionally, the magnetic member 20 may be separated by parting surfaces that extend parallel to the center axis of member 20 or that define an angle of not more than forty-five (45) degrees to the center axis of member 20, as shown in FIGS. 21(a) and 21(b) thereof.

Figure 4A:
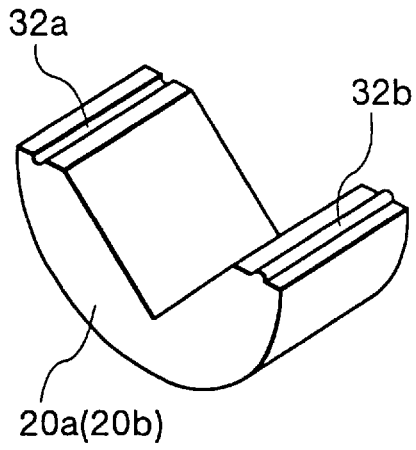
FIGS. 4(a)–4(d) are perspective views of other magnetic pieces according to the invention.

FIGS. 4(a)–4(d) show other embodiments of the present invention. In FIG. 4(a), a recessed portion 32a and a projecting portion 32b are formed on the parting surfaces 26 of the magnetic pieces 20a and 20b to ensure accurate relative radial positioning of the pieces 20a and 20b. Two magnetic pieces 20a and 20b are so combined that the recessed portions 32a and the projecting portions 32b of piece 20a mate with projecting portion 32b and recessed portion 32a, respectively of piece 20b, thus achieving correct radial positioning of the hollow portion and the peripheral profile of the material 20 automatically.

Figure 4B:
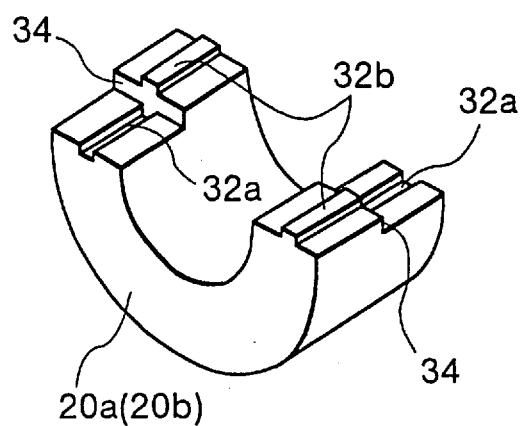

As shown in FIG. 4(b), radial positioning recessed and projecting portions 32a, 32b and axial positioning shoulder portions 34a, 34b may be formed in the parting surface 26 of the magnetic pieces 20a and 20b. For assembling the magnetic member 20, the magnetic pieces 20a and 20b are so combined that the recessed and projecting portions 32a, 32b are mated and the shoulder portions 34a, 34b are in abutment. As a result, the facing magnetic pieces 20a and 20b are positioned automatically. This may make easier assembly possible.

Figure 4C:
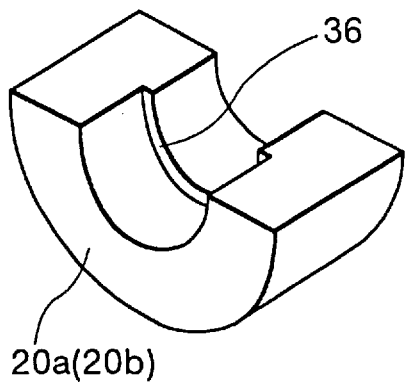

Furthermore, as shown in FIG. 4(c), a positioning shoulder portion 36 for a Faraday component (not shown) may be provided by changing the cross-sectional dimension in axial direction of the magnetic pieces 20a, 20b. In installation of a Faraday component into the magnetic pieces 20a, 20b, positioning of the Faraday component can be achieved automatically by simply urging the Faraday component towards the shoulder portion 36. Thus, assembly may be simplified.

Figure 4D:
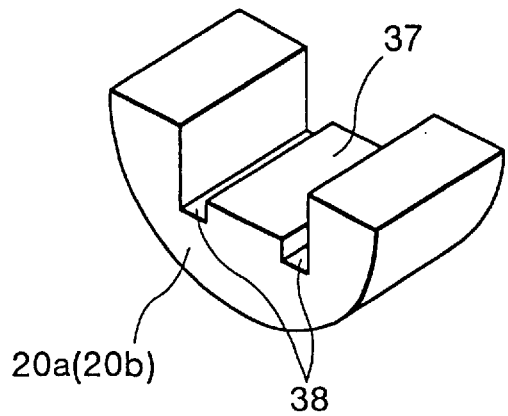

FIG. 4(d) shows yet another embodiment of a magnetic piece for an optical passive device according to this invention.

In this embodiment, each of the magnetic pieces 20a and 20b has a Faraday component fixing portion 37 and recessed portion 38. Bonding material such as an organic adhesive for fastening a Faraday component 22 (not shown) and the magnetic pieces 20a and 20b is applied to the bottom surface of the Faraday component fixing portion 37 before the Faraday component 22 is positioned therein. As the bonding material is residually applied to the fixing portion 37, the residual portion may contaminate the optical surfaces of the Faraday component 22 when the Faraday component 22 is placed on the fixing portion 37. However, the recessed portions 38 are formed in the bottom of the fixing portion 37 in this embodiment. Thus, the residual bonding material can be accommodated in the recessed portions 38 so that the optical surfaces of the Faraday component 22 will not be contaminated.

Figure 5A:
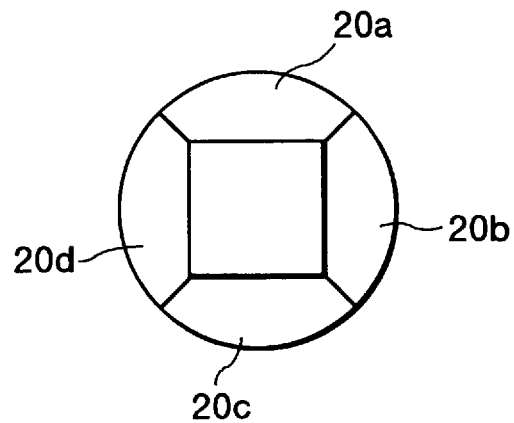
FIGS. 5(a)–5(c) are end views of magnetic members including magnetic pieces according to other embodiments of the present invention.
Figure 5B:
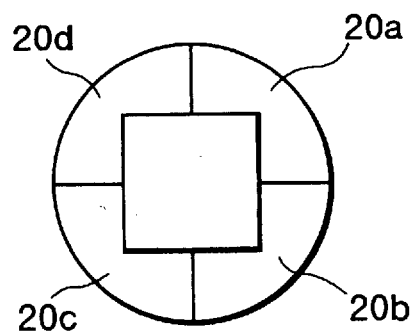
Figure 5C:
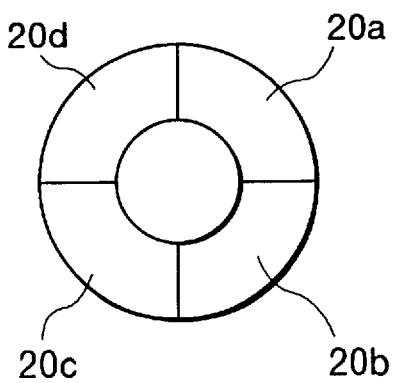

In above described embodiments of this invention, typical configurations are explained, in which cylindrical magnetic members 20 having half magnetic pieces 20a and 20b are employed. However, a magnetic member 20 may be formed with four magnetic pieces 20a–20d as shown in FIGS. 5(a)–5(c). If necessary, other structures of magnetic members may be employed, such as a magnetic member made up from three or five magnetic pieces.

Figure 6A:
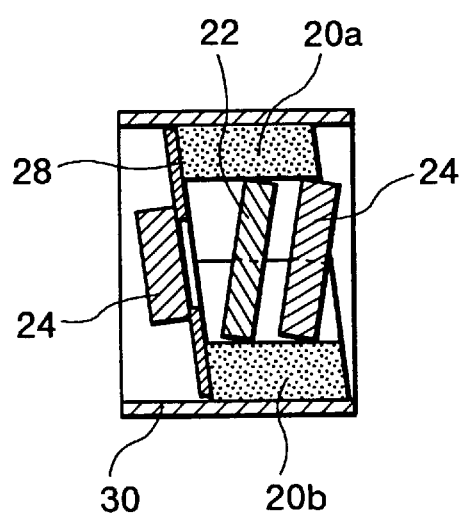
FIGS. 6(a) and 6(b) are sectional views and FIG. 6(c) is an end view of an optical isolator according to a further embodiment of the invention.
Figure 6C:
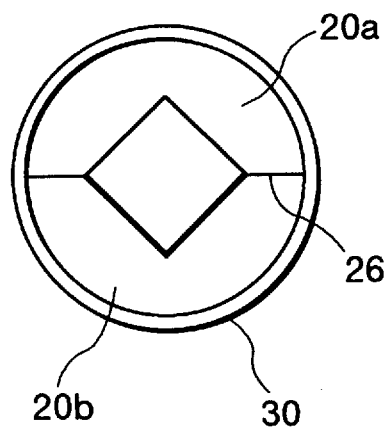
Figure 6B:
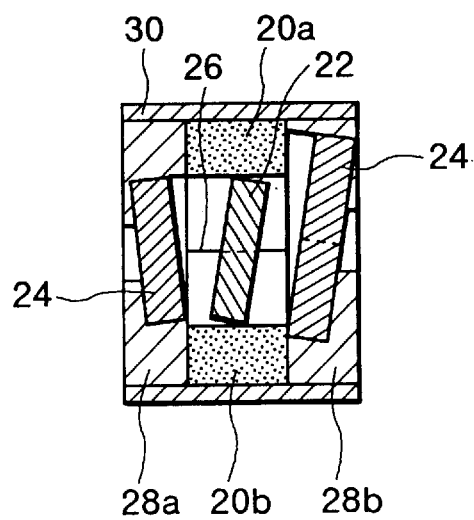

According to a further embodiment, opposite ends of the cylindrical magnetic member 20 are inclined to the optical axis as shown in FIG. 6(a). It is possible for only the Faraday component 22 to be fixed to the magnetic pieces 20a and 20b, while the polarizers 24 can be mounted with holders 28a, 28b as shown in FIG. 6(b).

Holders applied to the optical passive devices according to the present invention, that is holders for optical elements such as polarizers, hereinafter will be described. Perspective views of holders are shown in FIGS. 7(a)–7(f). A holder 40 as a supporting member for supporting a polarizer in FIG. 7(a) has a cross-sectional shape which is obtained by trimming a part of a cylinder along a plane parallel to the center axis of the cylinder. That is, a part of a solid cylindrical-shaped member (part A shown by dotted lines in FIG. 7(a)) is trimmed away along a cutting plane I—I extending parallel to the center axis (not shown) of the cylinder. Along a thus produced edge surface 42 is formed a notched portion 44 of rectangular cross section defining a recess for receiving the polarizer. As material for the holder 40, appropriate substance may be chosen from among metal material including iron such as stainless steel, ceramics, various resins, depending on manufacturing cost, feasibility and so on. It should be noted that the edge surface 42 may have an incline of not more than forty-five (45) degrees to the center axis of the holder 40, e.g. as shown in FIG. 7(f).

Figure 7A:
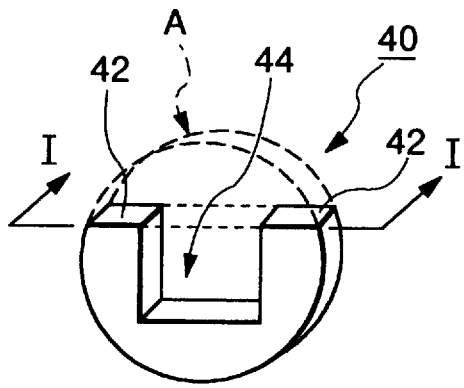
FIGS. 7(a)–7(f) are perspective views of holders for the optical isolators according to one embodiment of the present invention.
Figure 7B:
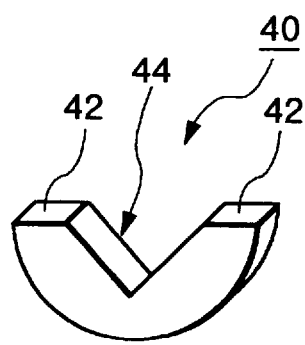
Figure 7C:
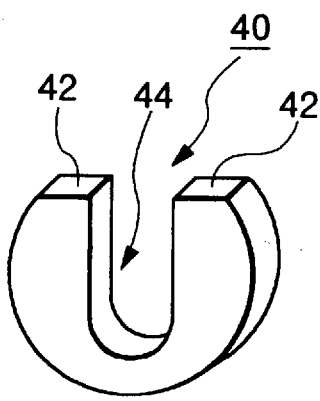
Figure 7D:
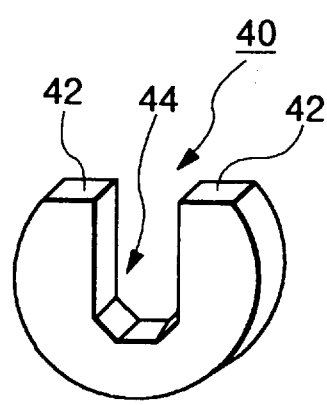
Figure 7E:
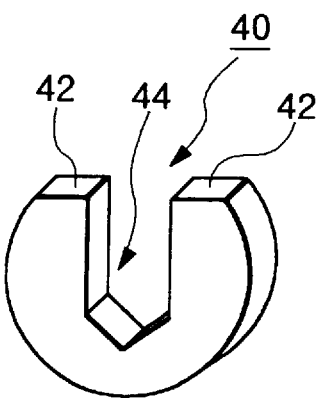
Figure 7F:
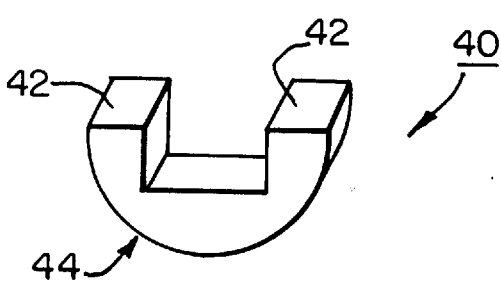

Holders 40 with notched portions 44 of different cross sections from that of the holder 40 in FIG. 7(a) are illustrated in FIGS. 7(b)–7(e). Polarizers are usually formed to have a rectangular shape when viewed in plan because such shape is generally most cost effective. However, from the view point of an optical element, it is sufficient for the polarizers to cover the area around the optical axis through which light rays can pass. Therefore, polarizers may have various shapes, such as circular, that are suitable for miniaturization of the device, since the polarizer may have the smallest area of the optical surface, or polygon such as a hexagonal shape. The notched portion 44 thus is not limited to the rectangular cross section of FIG. 7(a). A V-shape (FIG. 7(b)), U-shape (FIG. 7(c)), octagonal shape (FIG. 7(d)), hexagonal shape (FIG. 7(e)) can be employed, depending on the polarizer which is applied to the holder 40. The edge surface 42 may be suitably positioned to allow the device to become smaller on condition that the fundamental functions of the holder 40, for example manufacture and support thereof, are fulfilled.

Figures 8A, 8B:
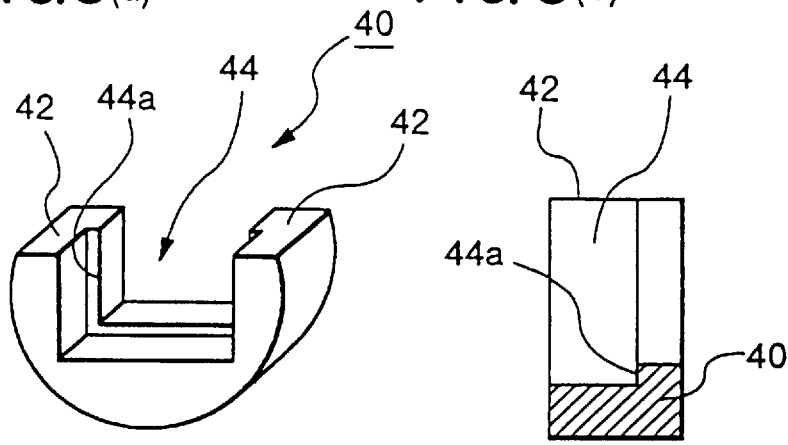
FIGS. 8(a) and 8(b) respectively are perspective and sectional views of a holder according to another embodiment of the present invention.

FIGS. 8(a) and 8(b) show another embodiment of a holder of the present invention, such holder including a positioning mechanism for a polarizer. As described regarding FIGS. 7(a)–7(f), the notched portion 44 is formed in the edge surface 42 of the holder 40. In this embodiment, a shoulder 44a as a polarizer positioning support is provided along the inner peripheral surface of the notched portion 44. This holder 40 enables easier assembly compared with the holder 40 of FIG. 7(a) without such shoulder 44a, because positioning of the polarizer can be easily achieved by simply urging the peripheral portion of the polarizer towards the shoulder 44a when the polarizer is installed in the notched portion 44. If the shoulder 44a located at the bottom of the notched portion 44 is inclined to the center axis of the holder 40 by a certain degree, assembly is even easier because the polarizer can be positioned at an angle of inclination angle to the optical axis by simply urging the polarizer to the shoulder 44a.

Figure 9A:
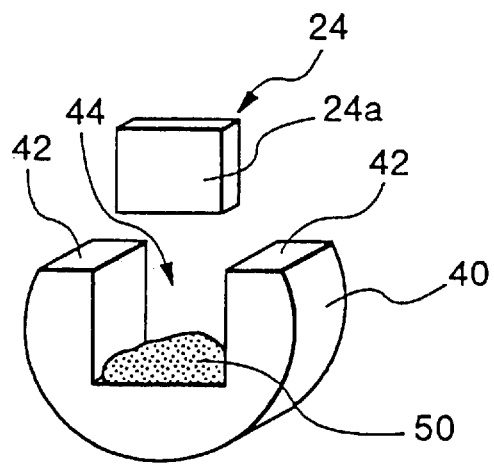
FIGS. 9(a) and 9(b) are perspective views illustrating installation of a polarizer to the holder of FIG. 7(a)
Figure 9B:
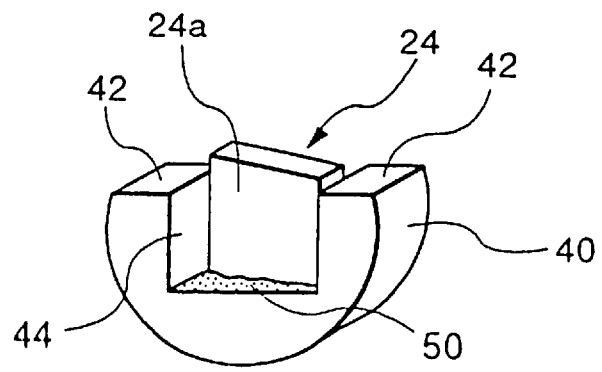

FIGS. 9(a) and 9(b) show installation of the polarizer into the holder. As shown in FIG. 9 (a), bonding material 50 for fastening the polarizer 24 and the holder 40 is applied to the bottom portion of the notched portion 44 formed into the edge surface 42 of the holder 40 prior to installation. As the bonding material 50, conventional material for fixing the polarizer 24, such as organic adhesive, solder, bonding glass material and welding flux, can be used. The state in which the polarizer 24 is fixed to the holder 40 is shown in FIG. 9(b). The polarizer 24 is fixed at non-optical sides thereof to inner peripheral surfaces defining the notched portion 44 of the holder 40. Accordingly, mechanical damage of the optical surfaces of the polarizer 24 caused by touching the holder 40 or contamination of the surfaces 24a by the bonding material 50 can be avoided.

Figure 10A:
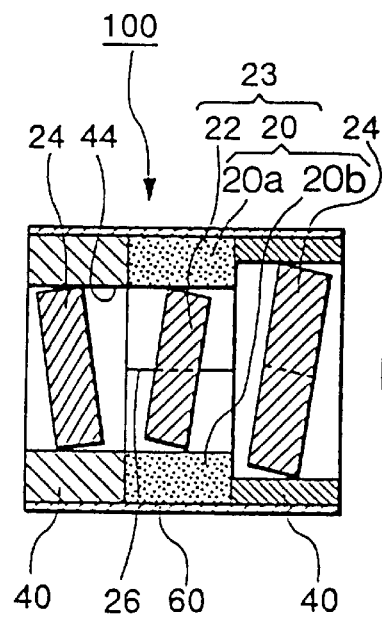
FIG. 10(a) is a sectional view of an optical isolator according to yet another embodiment of the present invention.
Figure 10B:
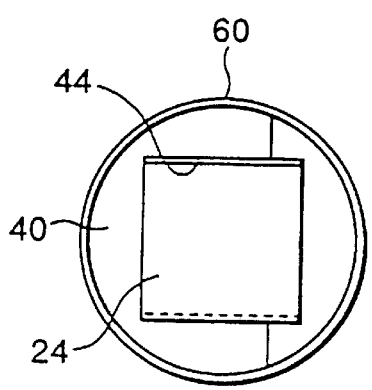
FIGS. 10(b) and 10(c) are end views from the left and right sides of FIG. 10(a)
Figure 10C:
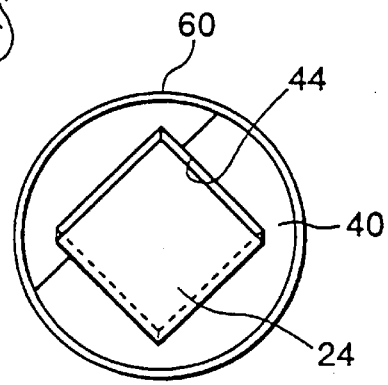

In FIGS. 10(a)–10(c) one embodiment of an optical isolator including the above-described holder is shown. The Faraday component 22 is fixed in the hollow portion of the cylindrical magnetic member 20. The magnetic member 20 is not an integral hollow cylinder but a complex of a plurality of magnetic pieces 20a, 20b, which constitute a hollow cylinder in this embodiment. The holders 40 are attached to opposite ends of the magnetic member 20 with an angular difference of forty-five (45) degrees between alignments of the holders 40 to the optical axis. Polarizers 24 are fixed beforehand to respective holders 40 by the above-mentioned bonding method. The optical isolator 100 is finished when the optical element assembly comprising the magnetic member 20 and the holders 40 are contained in a tube 60. The tube 60, e.g. of stainless steel, protects the components of the isolator 100, such as the magnetic member 20, the holders 40, the Faraday component 22 and the polarizers 24.

Figure 11:
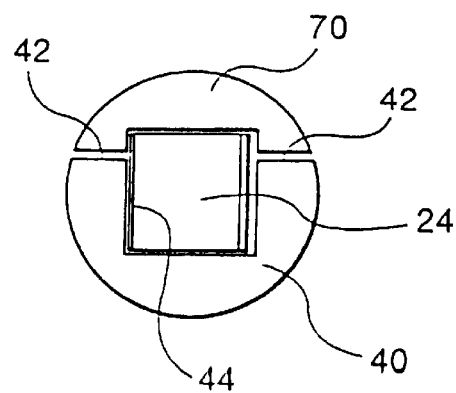
FIG. 11 is an elevation or end view of a holder for an optical isolator according to yet another embodiment of the invention.

When the polarizer 24 is supported by the above-mentioned holder 40, as typically shown in FIG. 9(b), a part of the polarizer 24 extends from the edge surface 42 of the holder 40. To overcome the shortcomings of this configuration, the embodiment in FIG. 11 includes a cap 70 as a protecting member for the polarizer 24 at the cutting surface 42 of the holder 40. Because the portion of the polarizer 24 extending beyond the edge surface 42 of the holder 40 is covered by the cap 70, the polarizer 24 is less likely to be damaged during manufacture. Furthermore, since the cap 70 is attached after the polarizer 24 is fixed to the holder 40, workability during installation of the polarizer 24 is not deteriorated. The cap 70 may be formed of the same material as that of the holder 40. Alternatively, appropriate materials such as metal material like stainless steel, ceramics, resin materials can be chosen for the cap 70.

Figure 12A:
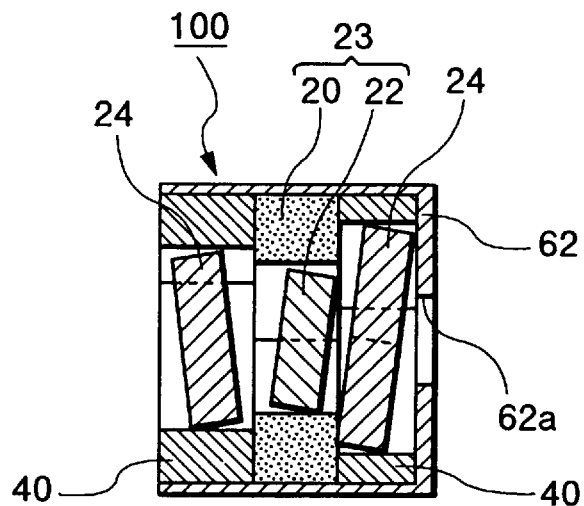
FIGS. 12(a)–12(c) are sectional views of optical isolators according to further embodiments of the present invention.
Figure 12B:
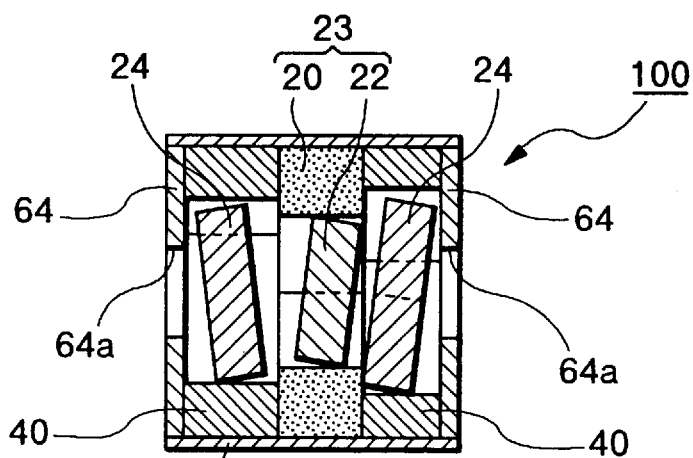
Figure 12C:
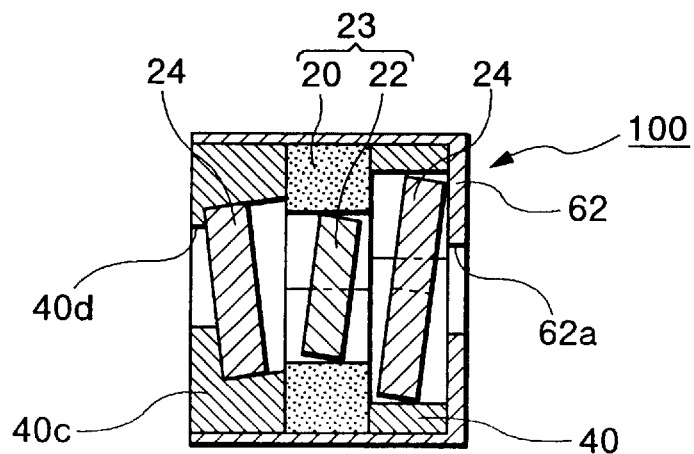
Figure 13A:
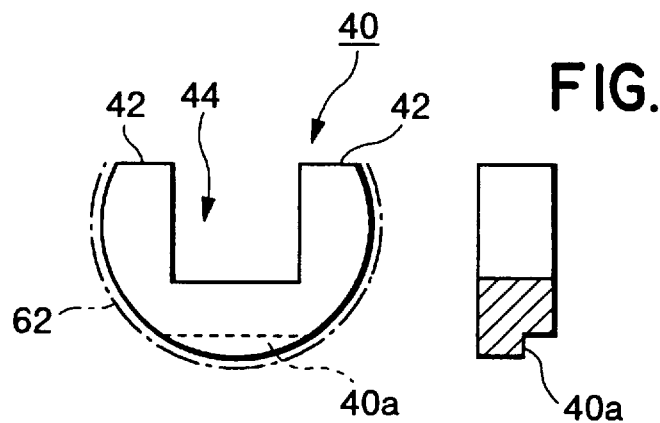
FIGS. 13(a) and 13(c) are elevation or end views of holders for optical isolators according to further embodiments of the present invention.
Figure 13B:
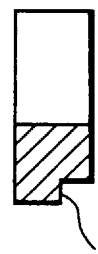
FIGS. 13(b) and 13(d) are sectional views through FIGS. 13(a) and 13(c), respectively.
Figure 13C:
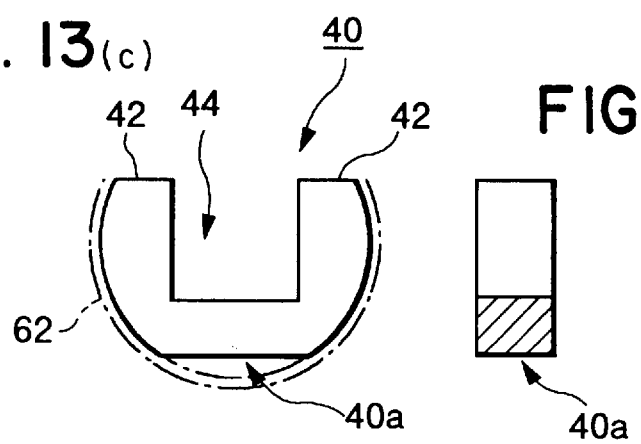
Figure 13D:
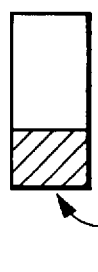

FIGS. 12(*a*)–12(*c*) are sectional views of further embodiments of optical isolators employing the structure according to the present invention, employing holders 40 of the above embodiments. The isolators of FIGS. 12(*a*)–12(*c*) include at least one reduced aperture for reducing leakage of light rays passing therethrough. In FIG. 12(*a*), cylindrical case 62 integrally containing the magnetic member 20 and the holders 40 has an aperture 62*a* at the one end of the isolator 100 on the optical axis thereof. The aperture 62*a* is a small opening through which light rays pass. As for FIG. 12(*b*), the tube 60 has at opposite ends thereof a pair of rings 64 with apertures 64*a* fixed respectively by such methods as insertion, welding, soldering and adhesion. The optical isolator 100 in FIG. 12(*c*) employs a conventional cylindrical holder 40*c* holding one polarizer 24 and in which is formed an aperture 40*d*. The case 62 containing the magnetic member 20 and the holders 40, 40*c* is substantially equivalent to that of FIG. 12(*a*). The optical isolator with the separate holders can achieve substantially the same degree of light leakage prevention as those of the conventional isolator with the integral holders, by using the parts having the apertures 62*a*, 64*a*.

FIGS. 13(*a*)–13(*d*) show further embodiments of holders employed for the optical isolators of this invention. In these embodiments, the holder 40 has at the bottom thereof, i.e. opposite notched portion 44, a second notched portion 40*a*. The notched portion 40*a* is formed by trimming away a part of the holder 40 in FIG. 13(*a*). In FIG. 13(*b*), the bottom portion of the holder 40 is cut away along a plane parallel to the bottom surface of the notched portion 44 to form the notched portion 40*a*. An optical isolator employing the holder 40 with the notched portion 40*a* results in a gap being formed between the cylindrical case 62 (shown by dashed lines in FIGS. 13(*a*) and 13(*c*)) and the bottom surface of the holder 40. An adjusting tool (not shown) may be inserted into such gap to rotate the holder 40 around the optical axis within the case 62 so that the angle of the plane of polarization of the polarizer 24 (not shown) can be conveniently adjusted.

Figure 14:
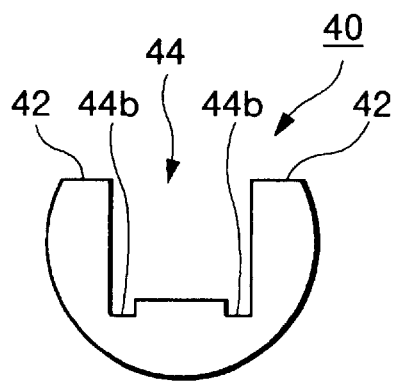
FIG. 14 is an elevation or end view of a holder of another embodiment of the invention.

FIG. 14 shows yet a further embodiment of the holder for the isolator of the present invention. Recessed portions 44*b* are provided within the holder 40 at bottom corners of the notched portion 44. As described above, bonding material such as organic adhesive for fastening the polarizer 24 (not shown) and the holder 40 is applied to the bottom surface of the notched portion 44 before the polarizer 24 is positioned therein. As the bonding material is residually applied to the notched portion 44, the residual portion may contaminate the optical surfaces of the polarizer 24 when the polarizer 24 is placed in the notched portion 44. However, such residual bonding material can be accommodated in the recessed portions 44*b* so that the optical surfaces of the polarizer 24 will not be contaminated.

Figure 15:
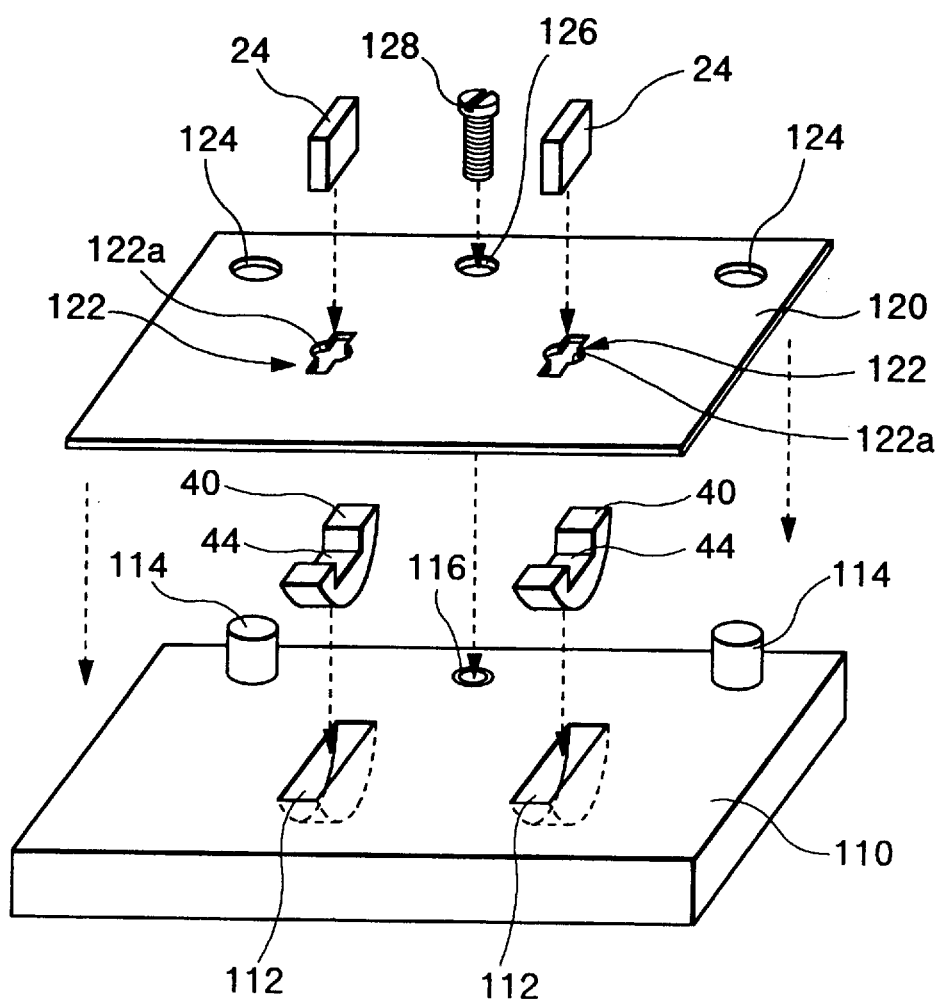
FIG. 15 is an exploded perspective view showing an assembling method of optical elements into an optical isolator according to one embodiment of the present invention.

Hereinafter, a method of assembling the above described optical isolators according to the invention will be discussed. FIG. 15 illustrates one embodiment of such method. The assembling method typically employs a jig primarily including a base 110 as a supporting member holder and a plate 120 as an optical component guide.

The base 110 further includes at least one recess 112 for accepting and holding securely a holder 40. The recess 112 is formed so that the holder 40 can be fit therein. At the same time, the recess 112 has sufficient depth such that the holder 40 fitting therein does not extend beyond the surface of the base 110. Thereby, the plate 120 can fully contact the top surface of the base 110. In FIG. 15, the recess 112 has substantially a semicircle cross section which corresponds to the cross section of the holder 40 accepted therein. However, the dimensions of the recess 112 may be varied depending on the shape of the holder 40.

Projecting upwardly from opposite ends of the base 110 are cylindrical pins 114 defining a first engaging portion. The shape of the pins 114 may be other various shapes, such as a prism, without being limited to the cylindrical shape in FIG. 15.

The plate 120 is a thin plate with thickness providing sufficient rigidity for holding polarizers 24. A pair of holes 124 defining a second engaging portion are formed through the plate 120 at opposite ends thereof. The pins 114 of the base 110 are inserted through the holes 124 to fix the plate 120 against the base 110 so as to be immovable laterally relative to each other. Thus, the pins 114 of the base 110 and the holes 124 of the plate 120 constitute positioning means for the plate 120. The jig is so designed that openings 122 formed in the plate 120 are positioned just above the recesses 112 of the base 110 when the plate 120 is fixed against the base 110 by engagement of the pins 114 with the holes 124. The length and the width of the opening 122 is defined depending on the shape and the dimensions of the polarizer 24. When the plate 120 is positioned on the base 110, the openings 122 are located just above the holders 40 disposed in the respective recesses 112.

In this embodiment, clearances 122*a* are defined by recesses in the peripheral edges of the opening 122 so that such edges are spaced from surfaces of a polarizer 24. The clearances 122*a* thus prevent the edges of the opening 122 from contacting the effective areas of the optical surfaces of the polarizer 24 through which light rays pass. Thus, such optical surfaces will not be damaged by the plate 120.

Also in this embodiment, the longitudinal center axis of the opening 122 in which a polarizer 24 is inserted does not extend at a right angle to the center axis of the holder 40. Therefore, the polarizer 24 is disposed in the holder 40 with the polarizer 24 inclined to the optical axis of the isolator. As discussed above, this arrangement of the polarizer 24 avoids disturbance of a light source by direct reflection of incident light rays from the surface of the polarizer 24. If required for structural reasons however, the longitudinal center axis of the opening 122 may be oriented to extend at a right angle to the center axis of the holder 40.

The plate 120 positioned on the base 110 by engagement of the pins 114 in the holes 124, is then fastened to base 110 by a screw 128 passing through a hole 126 in the plate 120 as a first fastening means and being threaded into a tapped hole 16 in base 110 as a second fastening means. The base 110 and the plate 120 may be fastened by other means such as a vice without being limited to the specifically illustrated embodiment.

Material for the base 110 and the plate 120 of the jig according to the present invention may be chosen from among metal, sintered material such as ceramics, resin and so on. The plate 120 may be specifically formed of a stainless steel plate having sufficient rigidity for holding the polarizer 24.

Operation of the assembling method according to this embodiment is as follows. The polarizer 24 is installed in the holder 40 by the following steps:

Step 1: The holder 40 is disposed in the recess 112 of the base 110 with the notched portion 44 directed upward.

Step 2: Bonding material for fixing the polarizer 24 is applied to the notched portion 44 prior to installation of the polarizer 24.

Step 3: The plate 120 is placed on the base 110 by inserting the pins 114 through the holes 124, and then the screw 128 is passed through the hole 126 and tightened into the tapped hole 116, thus fixing the plate 120 to the base 110.

Step 4: The polarizer 24 is inserted through the opening 122 formed in the plate 120 and disposed in the notched portion 44 of the holder 40 which is positioned just below the opening 122.

Figure 16A:
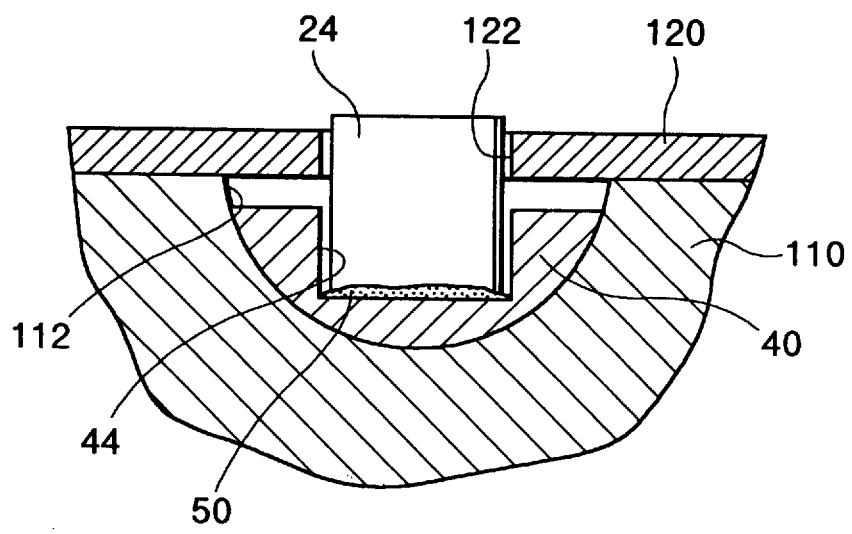
FIGS. 16(a) and 16(b) respectively are a partial sectional view and a partial plan view of a state where assembly steps of FIG. 15 are completed.
Figure 16B:
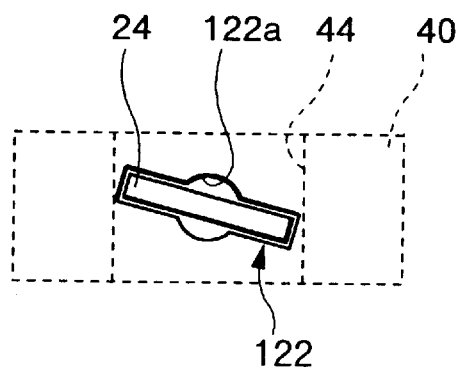

FIGS. 16(*a*) and 16(*b*) show the state in which <Step 4> is finished. FIG. 16(*a*) is a partly sectioned view of the base 110 and the plate 120 through the recess 112. FIG. 16(*b*) is a plan view of FIG. 16(*a*). It should be noted that the polarizer 24 in FIG. 16(*a*) is not shown in section to avoid complexity of illustration. The holder 40 is fit in the recess 112 of the base 110. The notched portion 44 is oriented upward. Because the opening 122 of the plate 120 is placed above the notched portion 44 of the holder 40, the polarizer 24 is positioned in the notched portion 44 by being simply dropped into the opening 122. The polarizer 24 disposed in the notched portion 44 is supported by the peripheral portion of the opening 122. thus, no other structure for supporting the polarizer 24 is required. The bonding material 50 such as organic adhesive is applied prior to installation of the polarizer 24, and the polarizer 24 is fastened to the holder 40 by simply leaving the polarizer 24 positioned in the notched portion 44.

As will be apparent from the various embodiments of the present invention described herein, the assembling method and the jig used therefor can be employed to install a Faraday component in a separate magnetic member including a plurality of magnetic pieces.

There accordingly has been described a structure of an optical passive device in which, since a magnetic member for applying a magnetic field to a Faraday component comprises a plurality of separate magnetic pieces, manufacture of respective magnetic pieces can be simplified and miniaturization of the magnetic member can be achieved. Furthermore, easy assembly of the device can be accomplished because the Faraday component is able to be installed prior to assembly of the magnetic member. Moreover, because a supporting member for supporting a polarizer is formed such that a part thereof is trimmed away along a plane substantially parallel to the center axis thereof and a notched portion to contain the polarizer is provided in a cutting surface defined thereby, the polarizer is easily fixed into the notched portion of the holder at non-optical sides thereof. Thus, optical surfaces of the polarizer are not damaged during assembly of the optical device. There also has been described an assembling method for the structure in which optical components such as Faraday components and polarizers can be easily positioned and the assembling operation can be improved while assembly precision is maintained, because the optical components are exactly positioned and held relative to a supporting member disposed in a supporting member holding device through an opening in an optical element guide.

It should be understood that the invention is not limited to the particular embodiments shown and described herein, but that various changes and modifications may be made thereto without departing from the spirit and scope of the invention as defined by the following claims.

What is claimed is:

1. An optical passive device including a Faraday component, a magnetic member supporting said Faraday component and applying a magnetic field thereto, said Faraday component and said magnetic member defining a Faraday rotator having an optical axis, and polarizers disposed on said optical axis according to an angle of rotation of a plane of polarization of said Faraday rotator, said magnetic member comprising:

a plurality of magnetic pieces joined together along confronting parting surfaces to define said magnetic member as a cylinder having a center axis, said confronting parting surfaces being spaced from each other circumferentially of said cylinder;

said confronting parting surfaces extending in at least one plane that extends parallel to said center axis; and positioning means provided at said confronting parting surfaces to control relative movement between said magnetic pieces in directions radially of said center axis, said positioning means comprising mating projections and recesses preventing relative radial movement between said magnetic pieces.

2. A device as claimed in claim 1, wherein said at least one plane contains said center axis.

3. A device as claimed in claim 1, comprising two said magnetic pieces each forming a half of said cylinder.

4. A device as claimed in claim 1, comprising four said magnetic pieces each forming a quarter of said cylinder.

5. A device as claimed in claim 1, wherein said projections and recesses are elongated in directions parallel to said at least one plane.

6. A device as claimed in claim 1, further comprising abutting shoulders on said magnetic pieces adjacent said confronting parting surfaces thereof preventing relative axial movement between said magnetic pieces.

7. A device as claimed in claim 1, wherein said cylinder has a hollow axially extending interior defined by first and second axial length portions of different radial dimension and defining therebetween a shoulder for positioning said Faraday component axially of said magnetic member.

8. A device as claimed in claim 1, wherein said magnetic member has a hollow axially extending interior defined at least partially by a surface forming a fixing portion for mounting of said Faraday component by bonding material, and at least one lateral recess for receipt of excess bonding material.

9. A device as claimed in claim 1, wherein said magnetic pieces each comprise a magnet selected from the group consisting of a sintered rare earth metal magnet or a plastic-bonded magnet.

10. A device as claimed in claim 1, further comprising supporting members for supporting and positioning said polarizers on said optical axis of said Faraday rotator, each said supporting member having a center axis and an edge surface extending in a plane that is parallel to said center axis of said each supporting member, and a notched portion extending radially inwardly of said supporting member from said edge surface thereof for receipt of the respective said polarizer.

11. A device as claimed in claim 10, wherein each said supporting member has a shape resulting from removing, from a cylinder, a portion which is cut away by a plane along said edge surface.

12. A device as claimed in claim 10, wherein each said supporting member is provided, in said notched portion thereof, with positioning means for determining the position of said polarizer therein.

13. A device as claimed in claim 12, wherein said positioning means comprises a shoulder formed by inner surfaces of said notched portion.

14. A device as claimed in claim 10, wherein said notched portion defines a surface for mounting of said polarizer by a bonding material, and at least one lateral recess for receipt of excess bonding material.

15. A device as claimed in claim 10, wherein a portion of each said supporting member opposite said edge surface has therein a further notched portion.

16. A device as claimed in claim 15, wherein said further notched portion defines a surface extending parallel to said edge surface.

17. A device as claimed in claim 15, wherein said further notched portion extends through the entire axial dimension of said each supporting member.

18. A device as claimed in claim 15, wherein said further notched portion extends through a portion only of the axial dimension of said each supporting member.

19. A device as claimed in claim 10, wherein said polarizer extends from said notched portion beyond said edge surface, and further comprising a protecting member covering the thus extended portion of said polarizer and abutting said edge surface.

20. An optical passive device including a Faraday component, a magnetic member supporting said Faraday component and applying a magnetic field thereto, said Faraday component and said magnetic member defining a Faraday rotator having an optical axis, and polarizers disposed on said optical axis according to an angle of rotation of a plane of polarization of said Faraday rotator, said magnetic member comprising:

a plurality of magnetic pieces joined together along confronting parting surfaces to define said magnetic member as a cylinder having a center axis, said confronting parting surfaces being spaced from each other circumferentially of said cylinder; and said confronting parting surfaces extending in at least one plane that is inclined to said center axis.

21. A device as claimed in claim 20, wherein said at least one plane intersects said center axis.

22. A device as claimed in claim 20, comprising two said magnetic pieces each forming a half of said cylinder.

23. A device as claimed in claim 20, comprising four said magnetic pieces each forming a quarter of said cylinder.

24. A device as claimed in claim 20, further comprising positioning means provided at said confronting parting surfaces to control relative movement between said magnetic pieces in directions radially of said center axis.

25. A device as claimed in claim 24, wherein said positioning means comprise mating projections and recesses preventing relative radial movement between said magnetic pieces.

26. A device as claimed in claim 25, wherein said projections and recesses are elongated in directions parallel to said at least one plane.

27. A device as claimed in claim 20, further comprising abutting shoulders on said magnetic pieces adjacent said confronting parting surfaces thereof preventing relative axial movement between said magnetic pieces.

28. A device as claimed in claim 20, wherein said cylinder has a hollow axially extending interior defined by first and second axial length portions of different radial dimension and defining therebetween a shoulder for positioning said Faraday component axially of said magnetic member.

29. A device as claimed in claim 20, wherein said magnetic member has a hollow axially extending interior defined at least partially by a surface forming a fixing portion for mounting of said Faraday component by bonding material, and at least one lateral recess for receipt of excess bonding material.

30. A device as claimed in claim 20, wherein said magnetic pieces each comprise a magnet selected from the group consisting of a sintered rare earth metal magnet or a plastic-bonded magnet.

31. A device as claimed in claim 20, further comprising supporting members for supporting and positioning said polarizers on said optical axis of said Faraday rotator, each said supporting member having a center axis and an edge surface extending in a plane to said center axis of said each supporting member that is inclined at an angle of not more than 45°, and a notched portion extending radially inwardly of said supporting member from said edge surface thereof for receipt of the respective said polarizer.

32. A device as claimed in claim 31, wherein each said supporting member has a shape resulting from removing, from a cylinder, a portion which is cut away by a plane along said edge surface.

33. A device as claimed in claim 31, wherein each said supporting member is provided, in said notched portion thereof, with positioning means for determining the position of said polarizer therein.

34. A device as claimed in claim 33, wherein said positioning means comprises a shoulder formed by inner surfaces of said notched portion.

35. A device as claimed in claim 31, wherein said notched portion defines a surface for mounting of said polarizer by a bonding material, and at least one lateral recess for receipt of excess bonding material.

36. A device as claimed in claim 31, wherein a portion of each said supporting member opposite said edge surface has therein a further notched portion.

37. A device as claimed in claim 36, wherein said further notched portion defines a surface extending parallel to said center axis of said each supporting member.

38. A device as claimed in claim 36, wherein said further notched portion extends through the entire axial dimension of said each supporting member.

39. A device as claimed in claim 36, wherein said further notched portion extends through a portion only of the axial dimension of said each supporting member.

40. A device as claimed in claim 31, wherein each said polarizer extends from said notched portion beyond said edge surface, and further comprising a protecting member covering the thus extended portion of said polarizer and abutting said edge surface.

41. An optical passive device including a Faraday component, a magnetic member supporting said Faraday component and applying a magnetic field thereto, said Faraday component and said magnetic member defining a Faraday rotator having an optical axis, and polarizers disposed on said optical axis according to an angle of rotation of a plane of polarization of said Faraday rotator, said magnetic member comprising:

a plurality of magnetic pieces joined together along confronting parting surfaces to define said magnetic member as a cylinder having a center axis, said confronting parting surfaces being spaced from each other circumferentially of said cylinder;

said confronting parting surfaces extending in at least one plane that extends parallel to said center axis; and said device further comprising supporting members for supporting and positioning said polarizers on said optical axis of said Faraday rotator, each said supporting member having a center axis and an edge surface extending in a plane that is parallel to said center axis of said each supporting member, and a notched portion extending radially inwardly of said supporting member from said edge surface thereof for receipt of the respective said polarizer.

42. A device as claimed in claim 41, wherein said at least one plane contains said center axis.

43. A device as claimed in claim 41, comprising two said magnetic pieces each forming a half of said cylinder.

44. A device as claimed in claim 41, comprising four said magnetic pieces each forming a quarter of said cylinder.

45. A device as claimed in claim 41, further comprising abutting shoulders on said magnetic pieces adjacent said confronting parting surfaces thereof preventing relative axial movement between said magnetic pieces.

46. A device as claimed in claim 41, wherein said cylinder has a hollow axially extending interior defined by first and second axial length portions of different radial dimension and defining therebetween a shoulder for positioning said Faraday component axially of said magnetic member.

47. A device as claimed in claim 41, wherein said magnetic member has a hollow axially extending interior defined at least partially by a surface forming a fixing portion for mounting of said Faraday component by bonding material, and at least one lateral recess for receipt of excess bonding material.

48. A device as claimed in claim 41, wherein said magnetic pieces each comprise a magnet selected from the group consisting of a sintered rare earth metal magnet or a plastic-bonded magnet.

49. A device as claimed in claim 41, wherein each said supporting member has a shape resulting from removing, from a cylinder, a portion which is cut away by a plane along said edge surface.

50. A device as claimed in claim 41, wherein each said supporting member is provided, in said notched portion thereof, with positioning means for determining the position of said polarizer therein.

51. A device as claimed in claim 50, wherein said positioning means comprises a shoulder formed by inner surfaces of said notched portion.

52. A device as claimed in claim 41, wherein said notched portion defines a surface for mounting of said polarizer by a bonding material, and at least one lateral recess for receipt of excess bonding material.

53. A device as claimed in claim 41, wherein a portion of each said supporting member opposite said edge surface has therein a further notched portion.

54. A device as claimed in claim 53, wherein said further notched portion defines a surface extending parallel to said edge surface.

55. A device as claimed in claim 53, wherein said further notched portion extends through the entire axial dimension of said each supporting member.

56. A device as claimed in claim 53, wherein said further notched portion extends through a portion only of the axial dimension of said each supporting member.

57. A device as claimed in claim 41, wherein each said polarizer extends from said notched portion beyond said edge surface, and further comprising a protecting member covering the thus extended portion of said polarizer and abutting said edge surface.

* * * * *